(12) United States Patent
Rosa et al.

(10) Patent No.: US 12,191,965 B2
(45) Date of Patent: Jan. 7, 2025

(54) CONFIGURED GRANT OPERATIONS FOR USE WITH BEAMFORMING

(71) Applicant: Nokia Technologies OY, Espoo (FI)

(72) Inventors: Claudio Rosa, Randers (DK); Esa Tiirola, Oulu (FI); Kari Hooli, Oulu (FI); Daniela Laselva, Klarup (DK); Nuno Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/003,746

(22) PCT Filed: Jun. 18, 2021

(86) PCT No.: PCT/EP2021/066535
§ 371 (c)(1),
(2) Date: Dec. 29, 2022

(87) PCT Pub. No.: WO2022/008205
PCT Pub. Date: Jan. 13, 2022

(65) Prior Publication Data
US 2023/0275641 A1    Aug. 31, 2023

(30) Foreign Application Priority Data
Jul. 6, 2020    (EP) .................................... 20184224

(51) Int. Cl.
*H04L 1/02*     (2006.01)
*H04B 7/06*    (2006.01)
*H04B 7/08*    (2006.01)

(52) U.S. Cl.
CPC ........... *H04B 7/0695* (2013.01); *H04B 7/063* (2013.01); *H04B 7/088* (2013.01); *H04B 7/0617* (2013.01)

(58) Field of Classification Search
CPC . H04B 7/0695; H04B 7/088; H04W 72/0446; H04W 74/0825; H04W 23/08;
(Continued)

(56) References Cited

U.S. PATENT DOCUMENTS 11,540,300 B2 * 12/2022 Wang .................. H04W 72/121
11,729,749 B2 *  8/2023 Jo ......................... H04L 5/1469
                                                      370/329
(Continued)

FOREIGN PATENT DOCUMENTS

EP    3565162 A1    11/2016
EP    3442155 A1     2/2019
(Continued)

OTHER PUBLICATIONS

"3rd Generation Partnership Project; Technical Specification Group Radio Access Network; NR; Radio Resource Control (RRC) protocol specification (Release 15)", 3GPP TS 38.331, V15.9.0, Mar. 2020, pp. 1-536.
(Continued)

*Primary Examiner* — Khai Tran
(74) *Attorney, Agent, or Firm* — Barta Jones, PLLC

(57) ABSTRACT

At least one embodiment includes at least one memory storing instructions; and at least one processor configured to execute the instructions and cause the apparatus to perform receiving downlink control information common to a plurality of apparatuses, wherein the downlink control information includes beam format information relating to an access node, and using the received beam format information to adapt transmission to the access node or reception from the access node on at least one channel.

20 Claims, 7 Drawing Sheets

Figure 1:
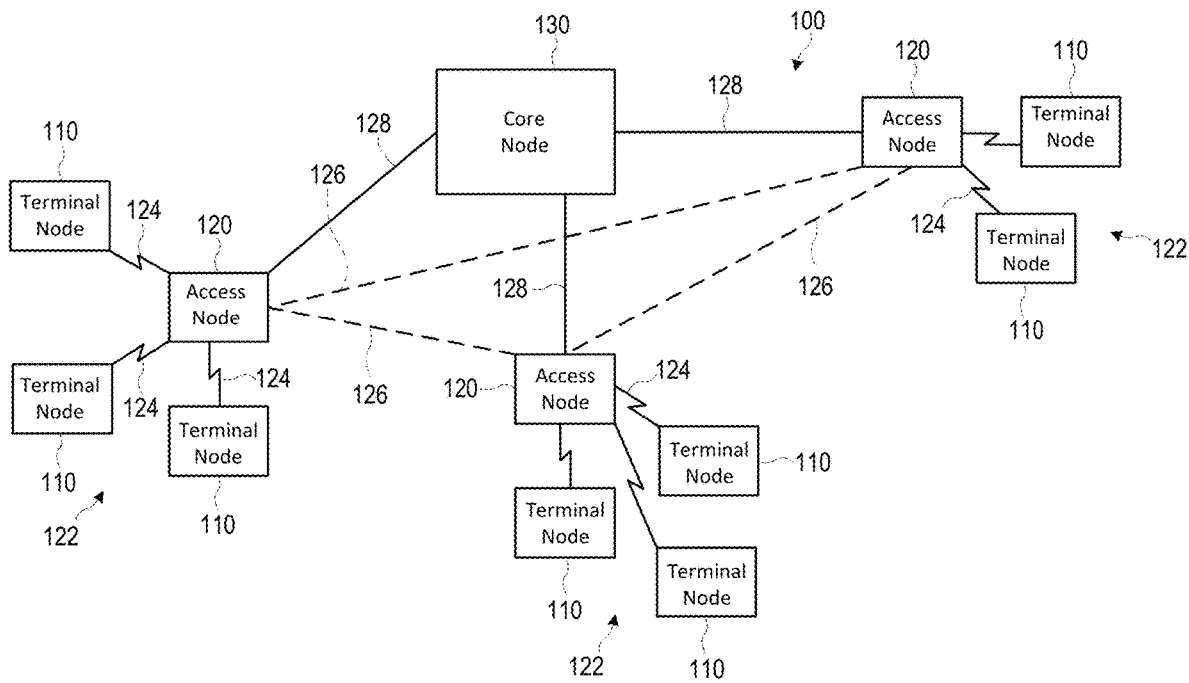

(58) Field of Classification Search
CPC .............. H04W 52/346; H04L 5/0098; H04L 25/03006; H04L 1/08; H04L 1/1887
USPC ........................................ 375/267, 260, 262
See application file for complete search history.

(56) References Cited

U.S. PATENT DOCUMENTS

| | | |
|---|---|---|
| 2015/0009968 A1 | 1/2015 | Yu et al. |
| 2019/0037426 A1 | 1/2019 | Yu et al. |
| 2019/0053227 A1* | 2/2019 | Huang .............. H04L 25/03006 |
| 2019/0268114 A1 | 8/2019 | Kang et al. |
| 2019/0268787 A1 | 8/2019 | Guan et al. |
| 2019/0306847 A1 | 10/2019 | Seo et al. |
| 2020/0045684 A1 | 2/2020 | Futaki |
| 2020/0205095 A1* | 6/2020 | Åström ................ H04W 48/12 |

FOREIGN PATENT DOCUMENTS

| | | |
|---|---|---|
| EP | 3667946 A1 | 6/2020 |
| JP | 2016-529778 A | 9/2016 |
| WO | 2019/160741 A1 | 8/2019 |
| WO | WO-2019/242461 A1 | 12/2019 |
| WO | 2020/029070 A1 | 2/2020 |
| WO | 2020/069740 A1 | 4/2020 |

OTHER PUBLICATIONS

"3rd Generation Partnership Project; Technical Specification Group Radio Access Network; NR; Physical layer procedures for control (Release 16)", 3GPP TS 38.213, V16.0.0, Dec. 2019, pp. 1-146.
"New SID: Study on supporting NR from 52.6GHz to 71 Ghz", 3GPP TSG RAN Meeting #86, RP-193259, Agenda Item: 9.1.1, Intel Corporation, Dec. 9-12, 2019, 3 pages.
"3rd Generation Partnership Project; Technical Specification Group Radio Access Network; NR; Multiplexing and channel coding (Release 16)", 3GPP TS 38.212, V16.0.0, Dec. 2019, pp. 1-145.
"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.
"NR downlink beam management signals", 3GPP TSG-RAN WG2 2017 RAN2#99 Meeting, R2-1709589, Agenda item: 10.2.10, Samsung, Aug. 21-25, 2017, 6 pages.
Extended European Search Report received for corresponding European Patent Application No. 20184224.2, dated Nov. 20, 2020, 8 pages.
Office Action received for corresponding Vietnamese Patent Application No. 1-2023-00694, dated Apr. 7, 2023, 2 pages of Office Action and 1 page of translation available.
Office Action received for corresponding Japanese Patent Application No. 2023-501020, dated Nov. 21, 2023, 4 pages of Office Action and 7 pages of translation available.
"RACH Procedures and Resource Configuration", 3GPP TSG RAN WG1 Meeting #88, R1-1701724, Agenda Item: 8.1.1.4.2, Huawei, Feb. 13-17, 2017, pp. 1-7.
"Remaining details on group-common Pdcch", 3GPP TSG RAN WG1 Meeting 90bis, R1-1717063, Agenda Item: 7.3.1.3, Huawei, Oct. 9-13, 2017, 6 pages.
International Search Report for International Application No. PCT/EP2021/066535 dated Jul. 28, 2021.
Examination Report for Indian Application No. 202347006455 dated May 10, 2023 and English translation.
English translation of JP Office Action, dated Jul. 9, 2024, by the Japanese Patent Office, in connection with JP Patent Application No. 2023-501020 (1 page).
Communication pursuant to Article 94(3) EPC, dated Oct. 7, 2024, by the EPO, in EP Application No. 20184224.2, 6 pages.

* cited by examiner

CONFIGURED GRANT OPERATIONS FOR USE WITH BEAMFORMING

CROSS-REFERENCE TO RELATED APPLICATIONS

This application is a national phase under 35 U.S.C. § 371 of PCT International Application No. PCT/EP2021/066535 which has an International filing date of Jun. 18, 2021, which claims priority to European Application No. 20184224.2, filed Jul. 6, 2020, the entire contents of each of which are hereby incorporated by reference.

TECHNOLOGICAL FIELD

Examples of the disclosure relate to configured grant operations for use with beamforming. Some relate to configured grant operations for use with beamforming in high frequency bands.

BACKGROUND

In New Radio (NR) it is possible to use configured uplink transmissions without the need to transmit a dynamic grant for each UL transmission occasion. These uplink resources are known as Configure Grant (CG) Physical Uplink Shared Channel (PUSCH) resources. In some examples the uplink grant can be configured via Radio Resource Control (RRC) or configured by RRC signalling and activated with a Physical Downlink Control Channel (PDCCH) (Downlink Control Information (DCI) addressed to Configured Scheduling Radio Network Temporary Identifier (CS-RNTI)).

In high frequency bands, above 52.6 GHz, analogue or hybrid beam forming can be used. The Next Generation Node B (gNB) needs to use specific reception (Rx) beam configurations that have been determined using a beam correspondence procedure with a User Equipment (UE) in order to receive any potential CG transmissions from the UE. However the gNB does not know when the UE has data to transmit using the configured UL CG resources which is problematic.

BRIEF SUMMARY

According to various, but not necessarily all, examples of the disclosure there is provided an apparatus comprising means for: receiving downlink control information common to a plurality of apparatus wherein the downlink control information comprises beam format information relating to an access node; and using the received beam format information to adapt transmission to the access node or reception from the access node on at least one channel.

The beam format information may relate to a plurality of slots or symbols following the slot or symbol in which the downlink control information is received and the apparatus may be configured to use the beam format information to adapt transmission to the access node or reception from the access node in one more of the symbols or slots to which the beam format information relates.

The downlink control information common to a plurality of apparatus may comprise a Group Common Physical Downlink Control Channel (GC-PDCCH) payload.

Adapting transmission to the access node may comprise adapting timing of an Uplink Configured Grant (UL CG) transmission.

Adapting transmission to the access node may comprise preventing the UL CG payload being transmitted if the beam format information indicates that a receiving beam of the access node is directed in a different direction to the apparatus for at least one slot or symbol originally intended for UL CG transmission.

Adapting transmission to the access node may comprise postponing transmission of the UL CG payload if a receiving beam of the access node is directed in a different direction to the apparatus for at least one slot or symbol originally intended for UL CG transmission.

Transmission of the UL CG payload may be postponed until the next available slot or symbol.

Adapting transmission to the access node may comprise only enabling transmission of the UL CG payload if a receiving beam of the access node is directed towards the apparatus for at least some of the slots or symbols intended for UL CG transmission and only enabling transmission of the UL CG payload in those slots or symbols intended for UL CG transmission for which the receiving beam of the access node is directed towards the apparatus.

Adapting reception from the access node may comprise using the beam format information to configure the apparatus to monitor for transmission from the access node during slots or symbols for which the beam format information indicates that a beam directed towards the apparatus is scheduled for use.

Adapting reception from the access node may comprise using the beam format information to configure the apparatus to not monitor for transmissions from the access node during slots or symbols for which the beam format information indicates that a beam directed towards the apparatus is not scheduled for use.

The apparatus may be configured with a plurality of beam pair links and the apparatus may be configured to use the beam format information to select one or more of the beam pair links for transmission.

The beam format information may comprise information on the beam configuration that is used by the access node for specified uplink symbols or slots or downlink symbols or slots.

The beam format information may be transmitted as part of a Synchronisation Signal Block (SSB) beam.

The beam format information may be transmitted with Slot Format Indicator (SFI).

The beam format information received by the apparatus may comprise information relating to the one or more beams on which the GC-PDCCH payload is transmitted.

The beam format information received by the apparatus may comprise information indicating whether a beam configuration or a beam within a set of beam configurations is served for specific symbol or slot.

The beam format information received by the apparatus may comprise information relating to the one or more beams on which the GC-PDCCH payload is transmitted and indicating whether the one or more beams is served for specific symbol or slot.

The beam format information received by the apparatus may comprise information indicating which one of the beams within the set of beam configurations is served.

According to various, but not necessarily all, examples of the disclosure there may be provided a User Equipment (UE) comprising an apparatus as described above and at least one Subscriber Identity Module (SIM).

According to various, but not necessarily all, examples of the disclosure there may be provided a Mobile Terminal (MT) comprising an apparatus as described above.

According to various, but not necessarily all, examples of the disclosure there may be provided a method comprising:

receiving downlink control information common to a plurality of apparatus wherein the downlink control information comprises beam format information relating to an access node; and using the received beam format information to adapt transmission to the access node or reception from the access node on at least one channel.

According to various, but not necessarily all, examples of the disclosure there may be provided computer program instructions for causing an apparatus to perform at least the following or for performing at least the following: receiving downlink control information common to a plurality of apparatus wherein the downlink control information comprises beam format information relating to an access node; and using the received beam format information to adapt transmission to the access node or reception from the access node on at least one channel.

According to various, but not necessarily all, examples of the disclosure there may be provided an Access Node comprising means for: transmitting downlink control information common to a plurality of apparatus wherein the downlink control information comprises beam format information relating to the access node.

The beam format information transmitted by the Access Node may relate to a plurality of slots or symbols following the slot or symbol in which the downlink control information is transmitted and may enable the plurality of apparatus to adapt transmission to the access node or reception from the access node in one more of the symbols or slots to which the beam format information relates.

In the Access Node the downlink control information common to a plurality of apparatus may comprise a Group Common Physical Downlink Control Channel (GC-PDCCH) payload.

The beam format information may enable an apparatus to adapt transmission to the access node or reception from the access node on at least one channel.

The Access Node may be configured to receive transmission from the apparatus following adaption of transmission by the apparatus using the beam format information.

The beam format information may comprise information on the beam configuration that is used by the access node for specified uplink symbols or slots or downlink symbols or slots.

The beam format information may be transmitted as part of a Synchronisation Signal Block (SSB) beam.

The beam format information may be transmitted with Slot Format Indicator (SFI).

The beam format information may comprise information relating to the one or more beams on which the GC-PDCCH payload is transmitted.

The beam format information may comprise information indicating whether a beam configuration or a beam within a set of beam configurations is served for specific symbol or slot.

The beam format information may comprise information relating to the one or more beams on which the GC-PDCCH payload is transmitted and indicating whether the one or more beams is served for specific symbol or slot.

The beam format information may comprise information indicating which one of the beams within the set of beam configurations is served.

BRIEF DESCRIPTION

Figure 2A:
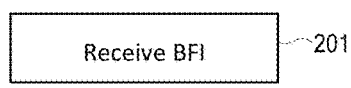
Figure 2B:
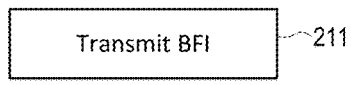
Figure 3:
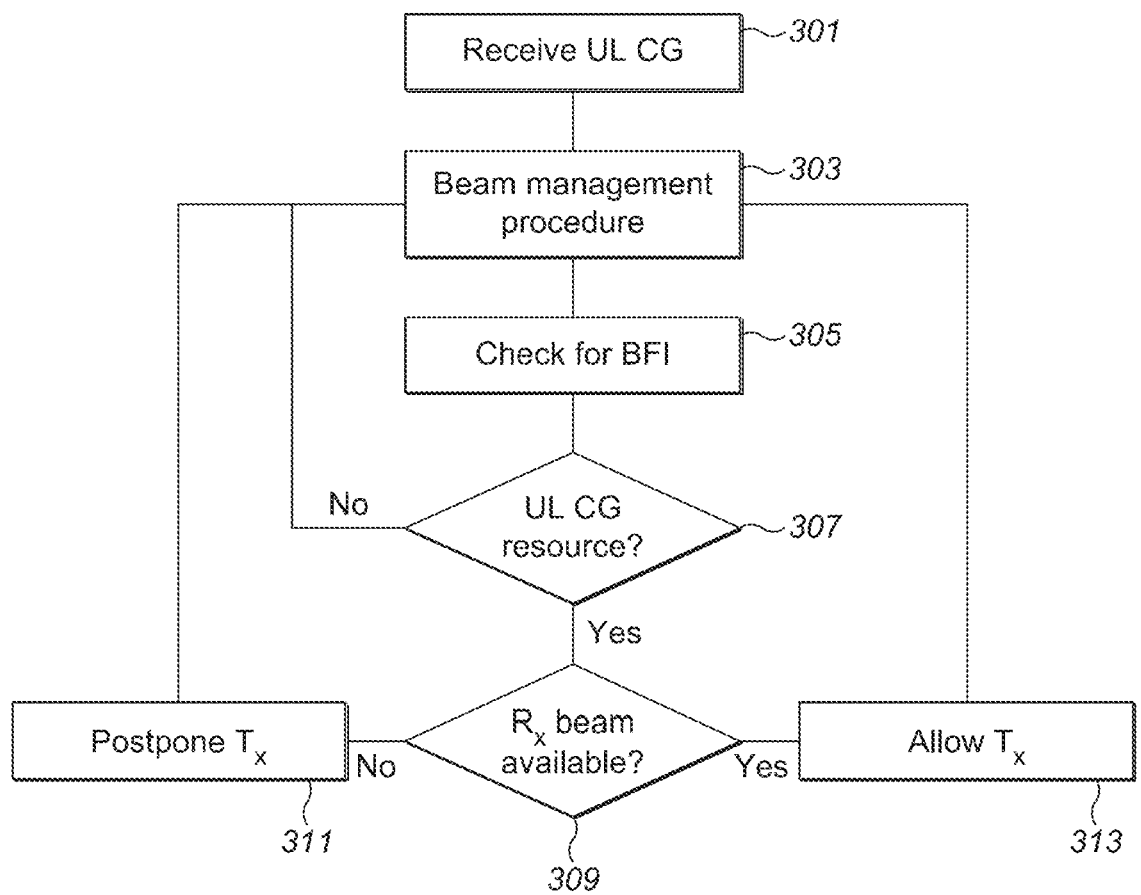
Figure 4:
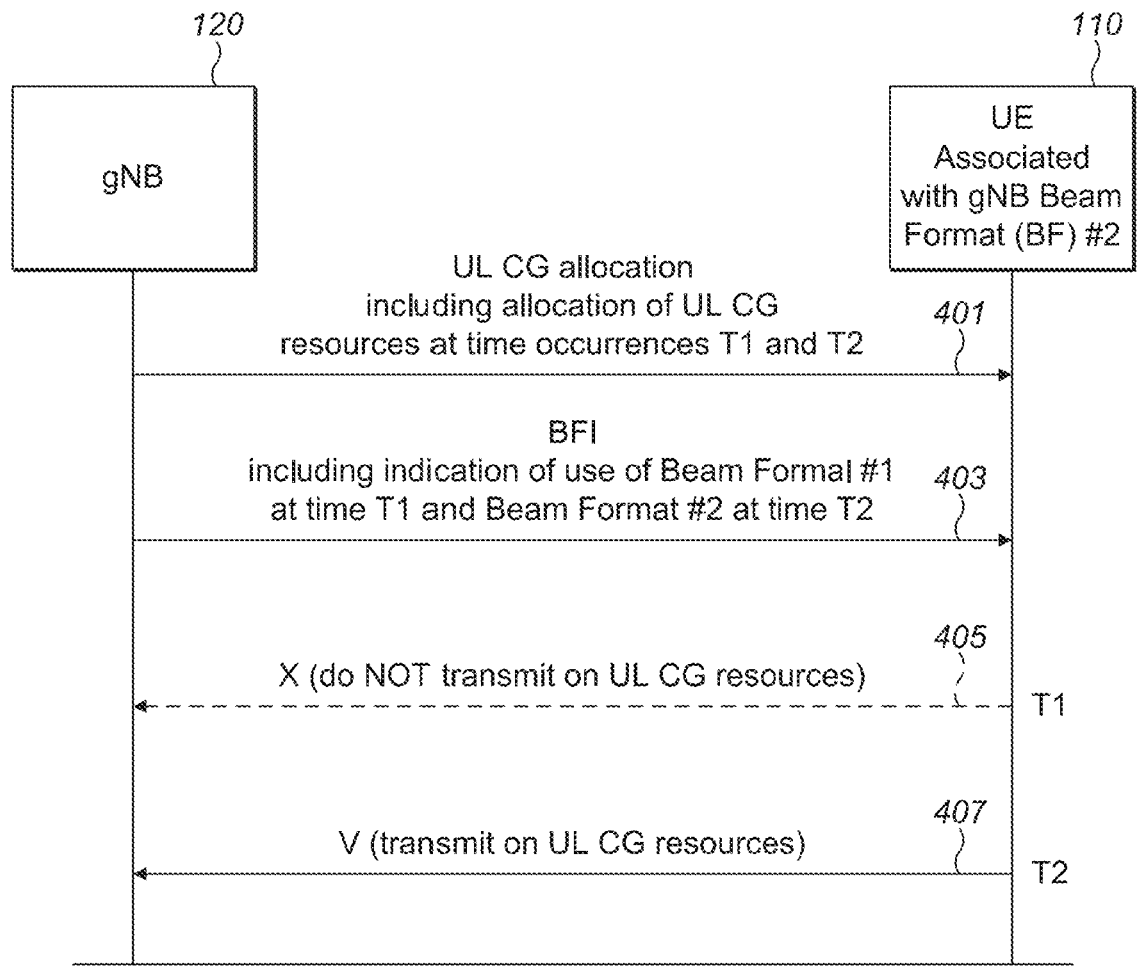
Figure 5A:
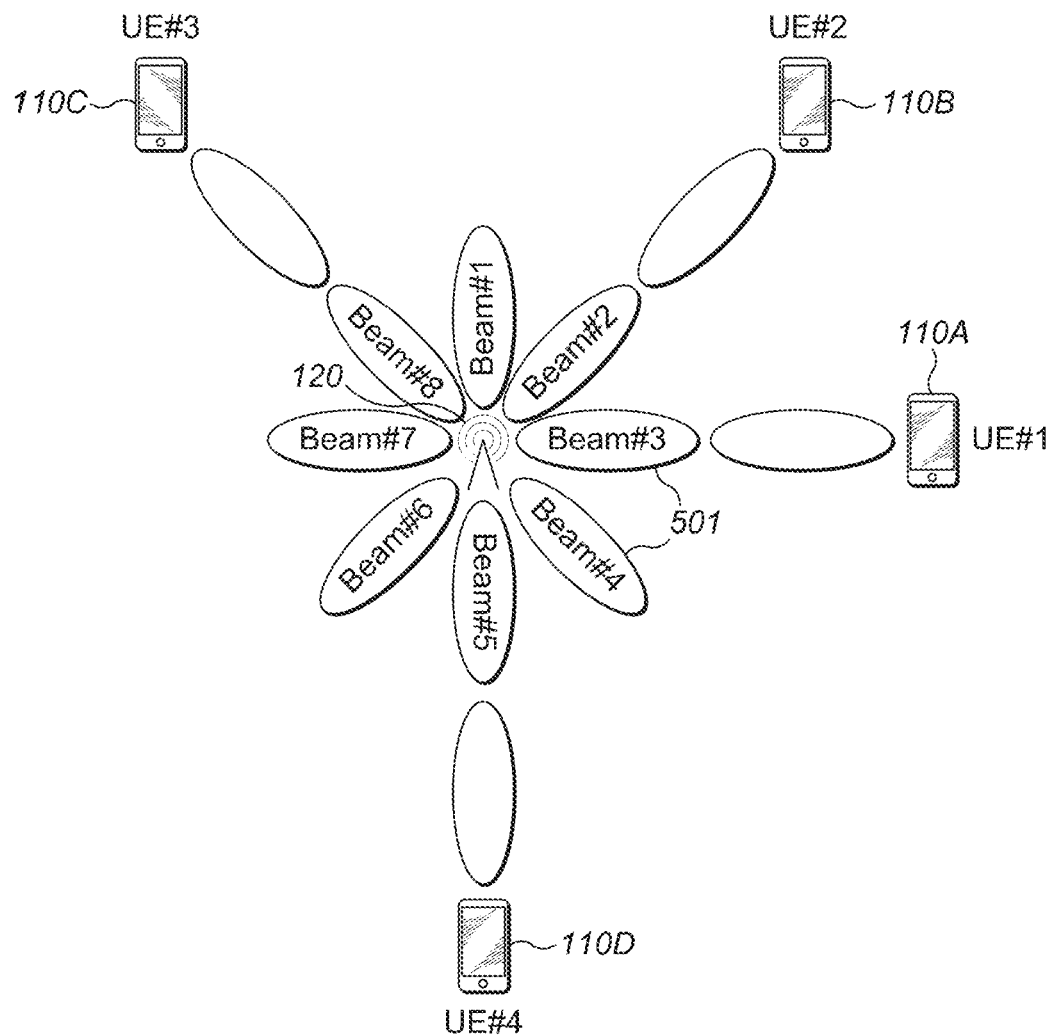
Figure 5B:
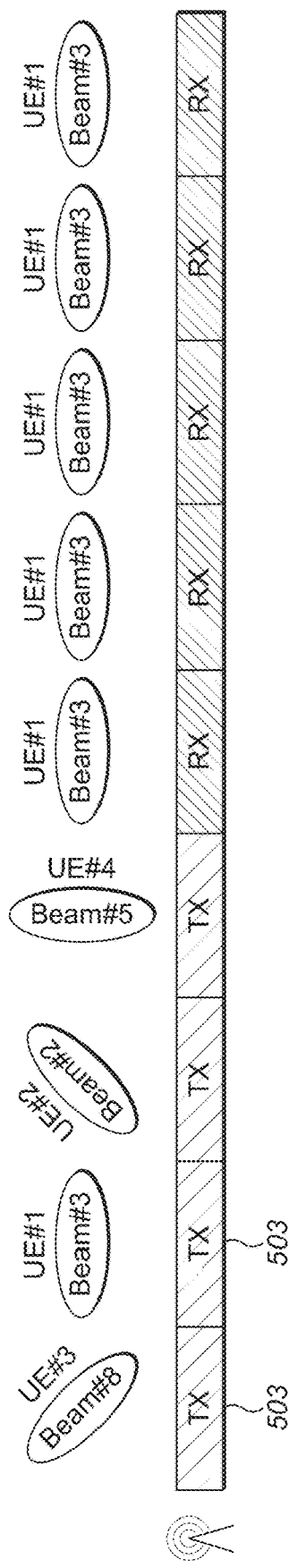
Figure 5C:
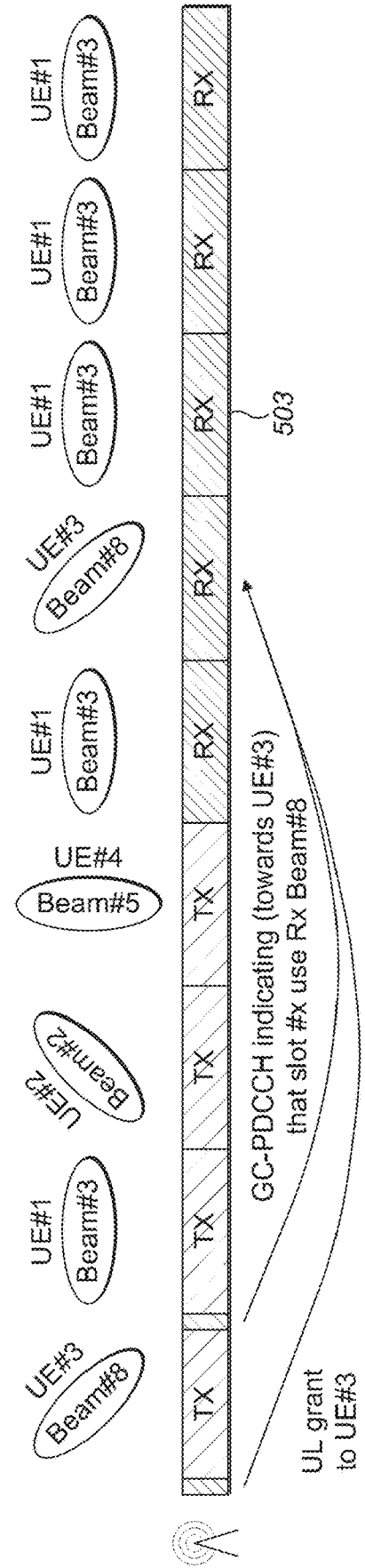
Figure 6:
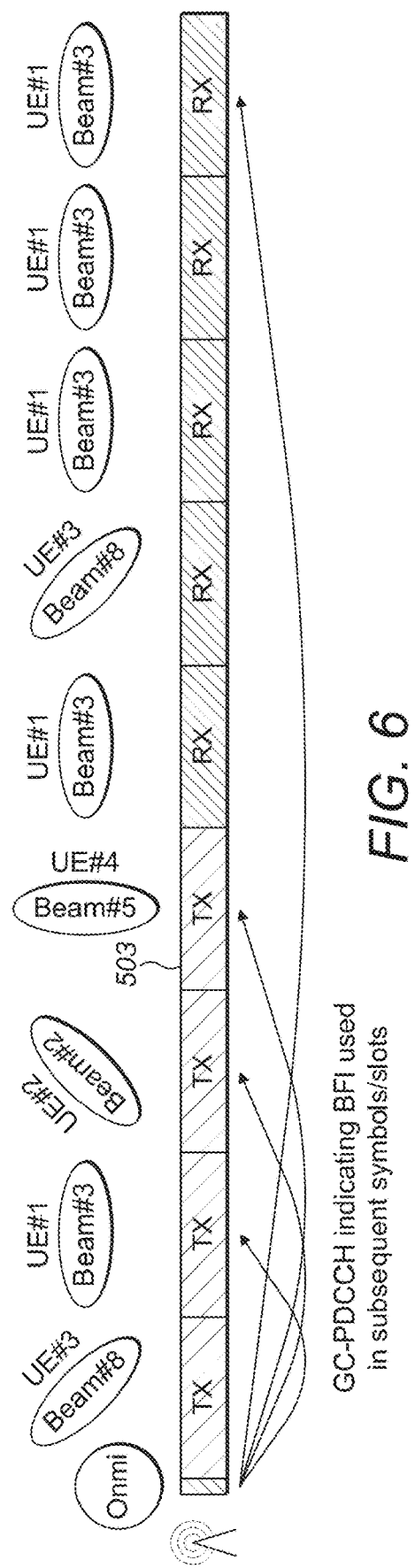
Figure 7A:
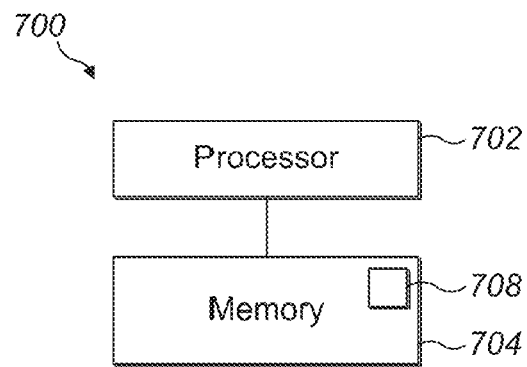
Figure 7B:
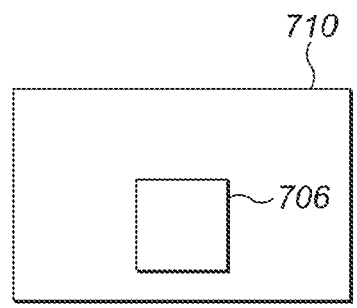

Some examples will now be described with reference to the accompanying drawings in which:

FIG. 1 shows an example system;
FIGS. 2A and 2B show example methods;
FIG. 3 shows another example method;
FIG. 4 shows example signals;
FIGS. 5A to 5C show an example embodiment;
FIG. 6 shows another example embodiment; and
FIGS. 7A and 7B show example apparatus.

DEFINITIONS

BFI Beam Format Information
CG Configured Grant
CS-RNTI Configured Scheduling RNTI
CSI-RS Channel State Information Reference Signal
DCI Downlink Control Information
DL Downlink
GC-PDCCH Group Common PDCCH
gNB Next Generation Node B
MAC Medium Access Control
MIMO Multiple Input Multiple Output
MT Mobile Terminal
NR New Radio
PDCCH Physical Downlink Control Channel
PUSCH Physical Uplink Shared Channel
RNTI Radio Network Temporary Identifier
RRC Radio Resource Control
SFI Slot Format Indicator
SSB Synchronisation Signal Block
TDD Time Division Duplex
TRP Transmission Reception Point
UE User Equipment
UL Uplink

DETAILED DESCRIPTION

FIG. 1 illustrates an example of a network 100 comprising a plurality of network nodes including terminal nodes 110, access nodes 120 and one or more core nodes 130. The terminal nodes 110 and access nodes 120 communicate with each other. The one or more core nodes 130 communicate with the access nodes 120.

The one or more core nodes 130 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

The term 'user equipment' is used to designate mobile equipment comprising a smart card for authentication/encryption etc such as a subscriber identity module (SIM).

A base station is an access node 120. It can be a network element in radio access network responsible for radio transmission and reception in one or more cells to or from the user equipment.

The network 100 can be a 5G network. It can for example be a New Radio (NR) network that uses gNB as access nodes 120. New radio is the 3GPP name for 5G technology.

The cellular network 100 shown in FIG. 1 could be configured to operate NR in high frequency bands. The high frequency bands can be above 52.6 GHz. In such frequency bands the cellular network 100 can be configured to use analogue or hybrid beamforming mechanisms.

FIG. 2A shows an example method that could be performed by an apparatus 110 in examples of the disclosure. In some examples the method could be performed by a UE or a Mobile Terminal (MT) or any other suitable apparatus 110. In some examples the method could be performed by the MT part of an Integrated Access and Backhaul (IAB) node.

The method comprises, at block 201, receiving downlink control information (DCI) that comprises beam format information (BFI). The DCI is common to a plurality of apparatus 110. The plurality of apparatus 110 can be located in different positions. The DCI can comprise a Group Common Physical Downlink Control Channel (GC-PDCCH) payload.

The DCI comprises BFI relating to an Access Node 120. The Access Node can be a gNB 120. The BFI comprises information relating to the beam configurations that are scheduled for use by the gNB 120. The BFI can comprise information on the beam configuration that is to be used by the gNB 120 for specified UL symbols or slots and for specified Downlink (DL) symbols or slots. The BFI relates to a plurality of slots or symbols following the slot or symbol in which the DCI is received.

The BFI can comprise information that associates gNB 120 resources such as slots or symbols with SSB beams or other beams such as CSI-RS (Channel State Information Reference Signal) beams. In some examples the BFI can identify the beam configuration used by the gNB 120 for either reception or transmission in specific symbols and slots by using an SSB index, a CSI-RS index or any other suitable identifier.

In some examples the BFI can relate to a plurality of different beam configurations for the gNB 120. For instance, the gNB 120 could be using a wide beam configuration, such as an omnidirectional beam configuration, for some of the slots of symbols. The omnidirectional beam configuration could cover all of the available narrow beam configurations. In such instances the BFI information could indicate "any beam configuration" for the relevant slots and symbols. If the wide beam configuration covers a plurality of the available narrow beam configurations, but not all of them, then the BFI can indicate a subset of the beam configurations that could be used.

In some examples the apparatus 110 and/or the gNB 120 can be configured to enable hybrid beam forming and/or multi-Transmission Reception Point (TRP) operation. In such examples the BFI could indicate a plurality of beams that could be used in a specific symbol or slot. For example, if an apparatus 110 is associated with two beam pair links, comprising gNB beam for reception or transmission and associated apparatus beam for transmission or reception, correspondingly, then the BFI could indicate, by indicating gNB beam associated with a beam pair link, whether the apparatus 110 can use, just the first beam pair link, just the second beam pair link, both of the beam pair links or neither of the beam pair links.

In some examples the BFI could indicate that the beams that are to be used by the gNB 120 has not yet been defined for one or more specific slots or symbols. In such examples this would mean that these slots or symbols are not yet available for UL CG transmission.

In some examples the BFI can relate to all of the available resources of the gNB 120. In other examples the signalling burden could be reduced by only providing the BFI relating to specified resources. For instance, only the BFI relating to resources available for UL CG transmission could be provided. In some examples only the BFI for resources relating to Scheduling requests (SR) or Sounding Reference Signals (SRS) could be provided. In these instances, the resources available for UL CG transmission or resources relating to SR or SRS and for which BFI is provided would be specified or determined fora UE 110.

In some examples the BFI can be specific to the beam or sets of beams on which it is transmitted. In such examples different BFI can be provided by the gNB 120 on different transmission beams. This can reduce the size of the BFI because it means that the BFI does not need to relate to all of the available beams. In such examples the BFI can indicate whether a beam configuration or a beam within a set of beam configurations associated with the transmission of the BFI is served or not for a given slot or symbol. In examples where BFI specific to a sub-set of beam configurations is provided the BFI can indicate whether or not the gNB 120 is transmitting or receiving using a beam outside of the sub-set of beam configurations. In some examples the BFI could be incorporated into a dynamic SFI indication by using an indication "not available" to indicate slots or symbols for which the gNB 120 is transmitting or receiving using a beam outside of the sub-set of beam configurations associated with a GC-PDCCH transmission.

The BFI can be transmitted to the apparatus 110 from the gNB 120. The BFI can be transmitted as part of Synchronisation Signal Block (SSB) beam so as to enable the BFI to be transmitted to all of the apparatus 110. In some examples the BFI can be transmitted with Slot Format Indicator (SFI). The BFI could be transmitted with the SFI as part of the GC-PDCCH. In other examples the BFI can be transmitted in a manner that is specific to the apparatus 110, for instance the BF could be conveyed via unicast DCI or via Medium Access Control Control Element (MAC CE).

The method also comprises, at block 203, using the received BFI to adapt transmission to the gNB 120 or reception from the gNB 120 on at least one channel. The BFI can be used to adapt transmission to the gNB 120 or reception from the gNB 120 in one or more of the symbols or slots to which the BFI relates.

In some examples adapting transmission to the gNB 120 comprises adapting timing of an Uplink Configured Grant (UL CG) transmission. The timing of the UL CG transmission can be adapted by postponing or preventing the transmission. The UL CG transmission can be postponed or prevented if the BFI indicates that a receiving beam of the gNB 120 is not directed towards the apparatus 110. This can be derived by determining whether or not the beam configuration used by the gNB 120 in a symbol or slot is a beam configuration which is associated with the apparatus 110. For example, if the BFI indicates SSB index #x and the apparatus 110 is communicating with the gNB 120 using SSB index #y, then the apparatus 110 determines the beam of the gNB 120 is not directed towards the apparatus 110. In another example, if GC-PDCCH monitored by the apparatus 110 indicates a slot or symbol is "not available", then it is determined that the beam of the gNB 120 is not directed towards the apparatus 110 in that specific slot or symbol.

In some examples adapting timing of the UL CG transmission comprises preventing the UL CG payload being transmitted if the received BFI indicates that a receiving beam of the gNB is directed in a different direction to the apparatus 110 for at least one slot or symbol originally intended for UL CG transmission. If the receiving beam is directed in a different direction to the apparatus 110 it could be directed towards a different apparatus 110. If the receiving beam is directed in a different direction to the apparatus 110 then the beam is not directed towards the apparatus 110.

In cases where the transmission of the UL CG payload is postponed it can be postponed until the next available slot or symbol. The UL CG payload can be postponed until the next slot or symbol that is available for UL CG transmission. In some examples the UL CG payload can be postponed until the next available slot or symbol in which the receiving beam of the gNB 120 is directed towards the apparatus 110.

In some examples the apparatus 110 can initiate a UL CG transmission that partially overlaps with a symbol or slot that is indicated by the BFI to relate to a different receiving beam configuration than the one(s) the apparatus 110 is associated with, i.e. it is using for communication with the gNB. This means that the receiving beam of the gNB 120 is only directed towards the apparatus 110 for some of the slots or symbols that are intended for UL CG transmission. In such examples the apparatus 110 could shorten the UL CG transmission so that transmission is only enabled for the UL CG payload in those slots or symbols intended for UL CG transmission for which the receiving beam of the gNB 120 is directed towards the apparatus 110. In other examples the entire UL CG transmission could be postponed to another set of slots or symbols.

In some examples the apparatus 110 can be configured to use the BFI to adapt reception from the gNB 120. In such examples the BFI can be used to configure the apparatus 110 to monitor for transmission from the gNB 120 during slots or symbols for which the BFI indicates that a beam directed towards the apparatus 110 is scheduled for use. The apparatus 110 can be configured to only monitor for transmission from the gNB 120 on such timeslots so that the apparatus 110 does not monitor for transmission from the gNB 120 during slots or symbols for which the BFI indicates that a beam directed towards the apparatus 110 is not scheduled for use. This can save power and resources of the apparatus 110.

In some examples the apparatus 110 can be configured with a plurality of beam pair links. In such examples the apparatus 110 can be configured to use the BFI to select one or more of the beam pair links for transmission. For example, the apparatus 110 can select a beam pair link that corresponds to a reception beam that is available for a current slot or symbol. This ensures that the apparatus 110 can transmit on a beam that will be received by the gNB 120.

FIG. 2B shows a corresponding example method that could be performed by an Access Node 120 such as a gNB or other suitable apparatus.

The method comprises, at block 211, transmitting DCI common to a plurality of apparatus 110 wherein the DCI comprises BFI relating to the access node 120. The plurality of apparatus 110 can be apparatus 110 configured to perform the method shown in FIG. 2A.

The BFI that is transmitted by the gNB 120 relates to a plurality of slots or symbols following the slot or symbol in which the DCI is transmitted and enables the plurality of apparatus 110 that receive the BFI to adapt transmission to the gNB 120 or reception from the gNB 120 in one more of the symbols or slots to which the BFI relates. The BFI comprises information relating to the beam configuration that is used by the gNB for specified uplink symbols or slots or downlink symbols or slots.

The BFI comprises information that enables any of the apparatus 110 that receive the BFI to adapt transmission to the access node or reception from the access node on at least one channel. The BFI is relevant to a plurality of apparatus 110.

The DCI comprising the BFI can be transmitted in any suitable manner. In some examples the BFI can be transmitted as part of a Synchronisation Signal Block (SSB) beam. In some examples the BFI can be transmitted with the Slot Format Indicator (SFI).

In some examples the DCI can comprise a GC-PDCCH payload. In such examples the BFI is signalled as part of GC-PDCCH payload. The BFI can comprise information relating to the sub-set of beams configurations associated with GC-PDCCH The gNB 120 that performs the method of FIG. 2B can also be configured to receive transmission from the apparatus 110 following adaption of transmission by the apparatus 110 using the BFI.

FIG. 3 shows another example method that can be performed in examples of the disclosure. The method could be performed by an apparatus 110 such as a UE or MT or any other suitable type of apparatus 110.

The method comprises, at block 301, receiving an allocation of UL CG resources. This can comprise an indication from the gNB 120 of the time occurrences at which the gNB 120 is able to receive via UL CG resources.

At block 303 the apparatus 110 performs a beam management procedure. During the beam management procedure the gNB 120 can determine which of the available beams are associated with the apparatus 110. That is the gNB 120 will identify which of the available beams are directed towards the apparatus 110.

At block 305 the apparatus 110 checks for BFI. The apparatus 110 can check if BFI has been received from the gNB 120. In some examples the apparatus 110 can check if BFI has been received from the gNB 120 at an earlier time and has been stored in the apparatus 110. In some examples new BFI could be received at block 305.

At block 307 the apparatus 110 checks if there is data to be transmitted and if there are UL CG resources available. The apparatus 110 can determine which symbols and slots have been allocated for UL CG. If there are no UL CG resources available, or if there is no data to be transmitted, then the method returns to block 303 and blocks 303 to 307 are repeated as needed.

If there is data to be transmitted and there are UL CG resources available then the method proceeds to block 309. At block 309 the method comprises checking the BFI to see if the gNB 120 has a receiving beam directed towards the apparatus 110 in the slots or symbols that are available for UL CG. That is the apparatus 110 can check that the gNB 120 will be listening in the right direction if they make the UL CG transmission during the slots or symbols identified in block 307.

If the gNB 120 does not have a receiving beam directed towards the apparatus 110 in the slots or symbols that are available for UL CG then, at block 311 the UL CG transmission is postponed or dropped so that no transmission is made using the UL CG resources identified in block 307. The method then returns to block 303. This can enable the data to be transmitted using a later slot or symbol.

In some examples the apparatus 110 can be provided with instructions from the network regarding how to proceed if the gNB 120 does not have a receiving beam directed towards the apparatus 110 in the slots or symbols that are available for UL CG. For instance, the apparatus 110 can be instructed to postpone or cancel the UL CG transmission or could be configured to use an alternative medium to transmit the UL CG payload to the gNB 120.

If the gNB 120 does have a receiving beam directed towards the apparatus 110 in the slots or symbols that are available for UL CG then, at block 313 the UL CG transmission is made using the UL CG resources identified in block 307. Once the transmission has been made the method can return to block 303.

FIG. 4 shows example signals that are transmitted between the gNB 120 and the apparatus 110. In this example the beam management procedure has been performed and it has been determined that the apparatus 110 is associated with beam format #2. It is to be appreciated that this assigned beam format is for example purposes only and any beam format could be used in implementations of the disclosure. For example, the apparatus 110 could be associated with multiple beams.

At block 401 the UL CG allocation is performed. This comprises the gNB 120 signalling the time occurrences for UL CG resources to the apparatus 110. In the example shown in FIG. 4 the UL CG resources are allocated for time occurrences T1 and T2. It is to be appreciated that other numbers of time occurrences could be allocated in other implementations of the disclosure.

At block 403 the gNB 120 transits the BFI to the apparatus 110. This indicates the beams that are to be used by the gNB 120 at specific slots or symbols. In this example the BFI indicates that beam #1 is to be used at time T1 and that beam #2 is to be used at time T2.

Block 405 occurs at time T1. At this time the apparatus 110 follows the method shown in FIG. 3. The apparatus 110 determines that there is data to transmit and that there are UL CG resources available at this time. However the apparatus 110 also determines that the beam allocated for this time is not the beam that is associated with the apparatus 110. That is the beam for time T1 is not beam #2. The apparatus 110 determines that the receiving beam is directed in a direction that is different to the apparatus 110 and so is not directed towards the apparatus 110. Therefore, at block 405 the apparatus 110 does not transmit using the UL CG resources.

Block 407 occurs at time T2. At this time the apparatus 110 follows the method shown in FIG. 3 and determines that there is data to transmit and that there are UL CG resources available at this time. However, this time the apparatus 110 also determines that the beam allocated for T2 is the beam that is associated with the apparatus 110 and so at block 405 the apparatus 110 transmits using the UL CG resources.

The methods shown in FIGS. 3 and 4 show how an apparatus 110 can adapt the timing of UL CG transmission using the BFI. It is to be appreciated that the apparatus 110 can also adapt how the apparatus 110 monitors for transmissions from the gNB 120. For instance, if the BFI indicates that gNB 120 will use a beam directed towards the apparatus 110 for a given slot of symbol then the apparatus 110 can be configured to monitor for signals from the gNB 120 during those slots or symbols. However, if the BFI indicates that the gNB 120 will use a different beam that is directed away from the apparatus 110 for a given slot or symbol then the apparatus 110 can be configured so that it doesn't monitor for signals from the gNB 120 during those slots or symbols. This can be used to limit the number of occasions that the apparatus 110 monitors for PDCCH transmissions and so can conserve power and resources of the apparatus 110.

FIGS. 5A to 5C show an example embodiment of the disclosure. FIG. 5A shows the beam configurations that are available to the gNB 120. In the example shown in FIG. 5A the beam configurations comprise eight beams 501. The eight beams 501 are distributed at angular intervals of 45° around the gNB 120. It is to be appreciated that this beam configuration is just an example and beam configurations using larger numbers of beams and different configurations of beams could be used in other examples of the disclosure.

In the example shown in FIG. 5A four apparatus 110 are positioned around the gNB 120. A first apparatus 110A is positioned at a bearing of 90°, a second apparatus 110B is positioned at a bearing of 45°, a third apparatus 110C is positioned at a bearing of 315° and a fourth apparatus 110D is positioned at a bearing of 180°.

The beam configuration of the gNB 120 is such that beam #3 is directed towards the first apparatus 110A, beam #2 is directed towards the second apparatus 110B, beam number #8 is directed towards the third apparatus 110C and beam #5 is directed towards the fourth apparatus 110D. The remaining beams #1, #4, #6 and #7 are not directed towards any apparatus 110.

FIG. 5B shows example BFI for the gNB 120. The BFI indicates the beam configuration associated with a given slot or symbol 503. In the example of FIG. 5B the BFI comprises four slots or symbols for transmission followed by five slots or symbols for reception.

In the first transmission slot or symbol 503 beam #8 is used, in the second transmission slot or symbol 503 beam #3 is used, in the third transmission slot or symbol 503 beam #2 is used and the fourth transmission slot or symbol 503 beam #5 is used. This sequence enables the gNB 120 to transmit to each of the apparatus 110 in turn.

In the example shown in FIG. 5B the gNB 120 uses beam #3 for each of the reception slots or symbols 503. This means that the beam is directed towards the first apparatus 110A. The gNB 120 would be able to receive UL CG transmission from the first apparatus 110A during these slots or symbols 503 but would not be able to receive transmissions from the other apparatus 110B, 110C, 110D.

FIG. 5C shows a different BFI for the gNB 120. In this example beam #8 is used for one of the reception slots or symbols 503. The first apparatus 110A is allocated UL CG resources in all of the slots or symbols 503. The apparatus 110C is not allocated UL CG resources. The gNB 120 allocates one of the slots or symbols 503 for UL transmission to apparatus 110C (e.g. using scheduled grant). The GC-PDCCH can then be used to signal that this slot or symbol 503 is not available for UL CG transmission by the first apparatus 110A, as the beam of the gNB 120 is directed toward the third apparatus 110C.

FIG. 6 shows an example embodiment of the BFI being transmitted to the apparatus 110. In this example the BFI is transmitted with the SFI as part of the GC-PDCCH. In this example, in each DL slot or symbol 503 the PDCCCH is transmitted using the same beam configuration as the corresponding PDSCH transmission. This means that only apparatus 110 that are associated with one of the beam configurations used for the PDSCH transmissions can detect the BFI in the specified slots or symbols 503. In order to reach all of the apparatus 110 within a cell the gNB 120 could transmit the BFI in multiple PDCCH occasions. Alternatively, as shown in FIG. 6 the gNB 120 could use a wide beam configuration to transmit the GC-PDCCH comprising the BFI. In this example the wide beam configuration is an omnidirectional configuration that can reach all of the apparatus 110 in the cell.

FIG. 7A illustrates an example of a controller 700. The controller could be provided within an apparatus such as a gNB 120 or a UE 110. Implementation of a controller 700 may be as controller circuitry. The controller 700 may be implemented in hardware alone, have certain aspects in software including firmware alone or can be a combination of hardware and software (including firmware).

As illustrated in FIG. 7A the controller 700 may be implemented using instructions that enable hardware functionality, for example, by using executable instructions of a computer program 706 in a general-purpose or special-purpose processor 702 that may be stored on a computer readable storage medium (disk, memory etc) to be executed by such a processor 702.

The processor 702 is configured to read from and write to the memory 704. The processor 702 may also comprise an output interface via which data and/or commands are output by the processor 702 and an input interface via which data and/or commands are input to the processor 702.

The memory 704 stores a computer program 706 comprising computer program instructions (computer program code) that controls the operation of the apparatus 110, 120 when loaded into the processor 702. The computer program instructions, of the computer program 706, provide the logic and routines that enables the apparatus to perform the methods illustrated in FIGS. 2A to 4. The processor 702 by reading the memory 704 is able to load and execute the computer program 706.

The apparatus 110 therefore comprises:
at least one processor 702; and
at least one memory 704 including computer program code;
the at least one memory 704 and the computer program code configured to, with the at least one processor 702, cause the apparatus 120 at least to perform:
receiving 201 downlink control information common to a plurality of apparatus 110 wherein the downlink control information comprises beam format information relating to an access node 120; and
using the received beam format information to adapt transmission to the access node 120 or reception from the access node 120 on at least one channel.

The Access Node 120 therefore comprises:
at least one processor 702; and
at least one memory 704 including computer program code;
the at least one memory 704 and the computer program code configured to, with the at least one processor 702, cause the access node 120 at least to perform:
transmitting 211 downlink control information common to a plurality of apparatus 110 wherein the downlink control information comprises beam format information relating to the access node 120.

As illustrated in FIG. 7B, the computer program 706 may arrive at the apparatus 110, 120 via any suitable delivery mechanism 710. The delivery mechanism 710 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 706. The delivery mechanism may be a signal configured to reliably transfer the computer program 706. The apparatus 110, 120 may propagate or transmit the computer program 706 as a computer data signal.

Computer program instructions for causing an apparatus 110 to perform at least the following or for performing at least the following:
receiving 201 downlink control information common to a plurality of apparatus 110 wherein the downlink control information comprises beam format information relating to an access node 120; and
using the received beam format information to adapt transmission to the access node 120 or reception from the access node 120 on at least one channel.

Computer program instructions for causing an Access Node 120 to perform at least the following or for performing at least the following:
transmitting 211 downlink control information common to a plurality of apparatus 110 wherein the downlink control information comprises beam format information relating to the access node 120.

The computer program instructions may be comprised in a computer program, a non-transitory computer readable medium, a computer program product, a machine readable medium. In some but not necessarily all examples, the computer program instructions may be distributed over more than one computer program.

Although the memory 704 is illustrated as a single component/circuitry it may be implemented as one or more separate components/circuitry some or all of which may be integrated/removable and/or may provide permanent/semi-permanent/dynamic/cached storage.

Although the processor 702 is illustrated as a single component/circuitry it may be implemented as one or more separate components/circuitry some or all of which may be integrated/removable. The processor 702 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2A:
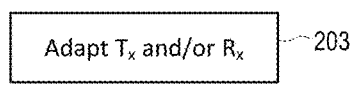

The stages illustrated in the FIGS. 2 to 4 can represent steps in a method and/or sections of code in the computer program 706. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

From the foregoing it will be appreciated that in some examples there is provided a system comprising:
- at least one access node 120 comprising means for transmitting 211 downlink control information common to a plurality of apparatus 110 wherein the downlink control information comprises beam format information relating to the access node 120; and
- one or more apparatus 110 comprising means for receiving 201 downlink control information common to a plurality of apparatus 110 wherein the downlink control information comprises beam format information relating to an access node 120; and using the received beam format information to adapt transmission to the access node 120 or reception from the access node 120 on at least one channel.

In some but not necessarily all examples, the UE 110 and gNB 120 are configured to communicate data with or without local storage of the data in a memory 570 at the UE 110 or gNB 120 and with or without local processing of the data by circuitry or processors at the UE 110 or gNB 120.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The UE 110 and gNB 120 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 110 where it may produce an output sensible to the subject such as an audio output, visual output or haptic output.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one memory storing instructions;
   at least one processor configured to execute the instructions and cause the apparatus to perform the following operations:
   receiving, from an access node, downlink control information, wherein the downlink control information comprises beam format information relating to the access node, the beam format information comprising information relating to beam configurations that are scheduled for use by the access node; and
   adapting communication with the access node on at least one channel, the adapting communication comprising: based on the beam format information, adapting reception from the access node by only monitoring for transmission from the access node during slots or symbols for which the beam format information indicates that a beam directed towards the apparatus is scheduled for use.

2. The apparatus as claimed in claim 1, wherein the downlink control information is received, from the access node, via common or dedicated signaling for the apparatus.

3. The apparatus as claimed in claim 1, wherein the beam format information relates to the slots or the symbols following a slot or symbol in which the downlink control information is received; and
   wherein the computer-executable instructions further cause the processor to use the beam format information to adapt transmission to the access node or the reception from the access node in one or more of the symbols or the slots to which the beam format information relates.

4. The apparatus as claimed in claim 1, wherein the downlink control information is common to a plurality of apparatus, the downlink control information comprising a Group Common Physical Downlink Control Channel (GC-PDCCH) payload.

5. The apparatus as claimed in claim 1, wherein the adapting communication with the access node comprises at least one of:
   adapting timing of an Uplink Configured Grant (UL CG) transmission;
   preventing an UL CG payload being transmitted if the beam format information indicates that a receiving beam of the access node is directed in a different direction to the apparatus for at least one slot or symbol originally intended for the UL CG transmission; and
   postponing transmission of the UL CG payload if the beam format information indicates that a receiving beam of the access node is directed in a different direction to the apparatus for at least one slot or symbol originally intended for the UL CG transmission.

6. The apparatus as claimed in claim 5, wherein the transmission of the UL CG payload is postponed until a next available slot or symbol.

7. The apparatus as claimed in claim 1, further comprising a plurality of beam pair links; and
   wherein the apparatus is caused to use the beam format information to select one or more of the beam pair links for transmission.

8. The apparatus as claimed in claim 1, wherein the beam format information comprises information on a configuration of the beam that is used by the access node for specified uplink symbols or slots or downlink symbols or slots.

9. The apparatus as claimed in claim 1, wherein the beam format information is transmitted as at least one of:
   part of a Synchronisation Signal Block (SSB) beam; and
   with Slot Format Indicator (SFI).

10. The apparatus as claimed in claim 1, wherein the apparatus is a user equipment.

11. An apparatus comprising:
    a plurality of beam pair links;
    a processor; and
    a memory comprising computer-executable instructions that, when executed by the processor, cause the apparatus to perform the following operations:
    receiving, from an access node, downlink control information, wherein the downlink control information comprises beam format information relating to the access node, the beam format information comprising information relating to beam configurations that are scheduled for use by the access node;
    using the beam format information to select one or more of the beam pair links for transmission; and
    using the received beam format information to adapt communication with the access node on at least one channel.

12. The apparatus as claimed in claim 11, wherein the downlink control information is received, from the access node, via common or dedicated signaling for the apparatus.

13. The apparatus as claimed in claim 11, wherein the beam format information relates to slots or symbols following a slot or symbol in which the downlink control information is received; and
    wherein the computer-executable instructions further cause the apparatus to use the beam format information to adapt transmission to the access node or the reception from the access node in one or more of the symbols or the slots to which the beam format information relates.

14. The apparatus as claimed in claim 11, wherein the downlink control information is common to a plurality of apparatus, the downlink control information comprising a Group Common Physical Downlink Control Channel (GC-PDCCH) payload.

15. The apparatus as claimed in claim 11, wherein adapting communication with the access node comprises at least one of:
adapting timing of an Uplink Configured Grant (UL CG) transmission;
preventing an UL CG payload being transmitted if the beam format information indicates that a receiving beam of the access node is directed in a different direction to the apparatus for at least one slot or symbol originally intended for the UL CG transmission; and
postponing transmission of the UL CG payload if the beam format information indicates that a receiving beam of the access node is directed in a different direction to the apparatus for at least one slot or symbol originally intended for the UL CG transmission, wherein the transmission of the UL CG payload is postponed until a next available slot or symbol.

16. The apparatus as claimed in claim 11, wherein the adapting communication comprises: based on the beam format information, adapting reception from the access node by only monitoring for transmission from the access node during slots or symbols for which the beam format information indicates that a beam directed towards the apparatus is scheduled for use.

17. An apparatus comprising:
a processor; and
a memory comprising computer-executable instructions that, when executed by the processor, cause the apparatus to perform the following operations:
receiving, from an access node, downlink control information, wherein the downlink control information comprises beam format information relating to the access node, the beam format information comprising information relating to beam configurations that are scheduled for use by the access node; and
using the received beam format information to adapt communication with the access node on at least one channel, the adapting communication with the access node comprises at least one of:
adapting timing of an Uplink Configured Grant (UL CG) transmission;
preventing an UL CG payload being transmitted if the beam format information indicates that a receiving beam of the access node is directed in a different direction to the apparatus for at least one slot or symbol originally intended for the UL CG transmission; and
postponing transmission of the UL CG payload if the beam format information indicates that a receiving beam of the access node is directed in a different direction to the apparatus for at least one slot or symbol originally intended for the UL CG transmission, wherein the transmission of the UL CG payload is postponed until a next available slot or symbol.

18. The apparatus as claimed in claim 17, wherein the adapting communication comprises: based on the beam format information, adapting reception from the access node by only monitoring for transmission from the access node during slots or symbols for which the beam format information indicates that a beam directed towards the apparatus is scheduled for use.

19. The apparatus as claimed in claim 17, further comprising a plurality of beam pair links; and
wherein the computer-executable instructions further cause the apparatus to use the beam format information to select one or more of the beam pair links for transmission.

20. The apparatus as claimed in claim 17, wherein the beam format information relates to the slots or the symbols following a slot or symbol in which the downlink control information is received; and
wherein the computer-executable instructions further cause the apparatus to use the beam format information to adapt transmission to the access node or the reception from the access node in one or more of the symbols or the slots to which the beam format information relates.

* * * * *